(12) United States Patent
Mihai

(10) Patent No.: US 8,985,316 B2
(45) Date of Patent: Mar. 24, 2015

(54) CONVEYOR DEVICE

(75) Inventor: Claudiu Mihai, Tewkesbury (GB)

(73) Assignee: Sparc Systems Limited, Malvern Worcestershire (GB)

( * ) Notice: Subject to any disclaimer, the term of this patent is extended or adjusted under 35 U.S.C. 154(b) by 0 days.

(21) Appl. No.: 13/819,734

(22) PCT Filed: Aug. 31, 2011

(86) PCT No.: PCT/GB2011/051636
§ 371 (c)(1),
(2), (4) Date: Jun. 6, 2013

(87) PCT Pub. No.: WO2012/028879
PCT Pub. Date: Mar. 8, 2012

(65) Prior Publication Data
US 2013/0270072 A1    Oct. 17, 2013

(30) Foreign Application Priority Data
Aug. 31, 2010 (GB) .................................. 1014477.2

(51) Int. Cl.
| | |
|---|---|
| *B65G 15/28* | (2006.01) |
| *B65G 23/18* | (2006.01) |
| *G01G 11/00* | (2006.01) |
| *G01G 15/00* | (2006.01) |
| *G01G 21/30* | (2006.01) |

(52) U.S. Cl.
CPC ................ *B65G 15/28* (2013.01); *B65G 23/18* (2013.01); *G01G 11/00* (2013.01); *G01G 15/00* (2013.01); *G01G 21/30* (2013.01)
USPC .......................................... 198/805; 198/493

(58) Field of Classification Search
USPC .......................................... 198/805, 493, 959
See application file for complete search history.

(56) References Cited

U.S. PATENT DOCUMENTS

| 3,947,056 A | * | 3/1976 | Schwanz ..................... 280/730.1 |
| 6,510,941 B2 | * | 1/2003 | Schermutzki et al. ...... 198/836.1 |
| 2002/0112940 A1 | * | 8/2002 | Dickover et al. .............. 198/835 |

(Continued)

FOREIGN PATENT DOCUMENTS

| EP | 0514107 A | * 11/1992 | ................... 198/959 |
| GB | 2284105 | 5/1995 | |

(Continued)

OTHER PUBLICATIONS

International Search Report dated Dec. 22, 2011 for PCT Application No. PCT/GB2011/051636.

(Continued)

*Primary Examiner* — Mark A Deuble
(74) *Attorney, Agent, or Firm* — A.C. Entis-IP Ltd.

(57) ABSTRACT

The conveyor device comprises a support, a magnetic driving unit at the support, and an at least substantially sealed conveyor unit demountably supportable on the support. The conveyor unit includes a magnetic drivable unit magnetically drivable by the said magnetic driving unit, and an endless conveyor belt extending around two spaced apart rollers. At least one of the rollers is drivable by the said drivable unit. The conveyor unit is thus preferably demountable from the support for cleaning without requiring disconnection of a physical drive and/or electrical feed extending between the conveyor unit and the support. Additionally, a weighing element is preferably provided at the support to dynamically weigh an item as it moves along the conveyor unit.

20 Claims, 3 Drawing Sheets

(56) References Cited

U.S. PATENT DOCUMENTS

| | | | |
|---|---|---|---|
| 2004/0238232 A1* | 12/2004 | Olafsson et al. | 177/145 |
| 2006/0289277 A1* | 12/2006 | Berger et al. | 198/502.1 |
| 2009/0183972 A1* | 7/2009 | Gauss et al. | 198/805 |

FOREIGN PATENT DOCUMENTS

| | | |
|---|---|---|
| JP | 55048111 | 4/1980 |
| JP | 6117905 | 4/1994 |
| JP | 2005272102 | 10/2005 |
| JP | 2007276887 | 10/2007 |
| JP | 2008195490 | 8/2008 |
| JP | 2008302992 | 12/2008 |
| WO | 2005/063600 | 7/2005 |

OTHER PUBLICATIONS

British Search Report dated Jan. 24, 2012 for GB Patent Application No. GB114477.2.

Chinese Office Action dated Mar. 3, 2014 for corresponding Chinese Application No. 2011800418229.

* cited by examiner dynamically weighing the said item as it travels on the conveyor unit, the conveyor device being downstream of the in-feed conveyor, and a take-off conveyor downstream of the conveyor device for separating off an out-of-weight-tolerance item following weighing.

CONVEYOR DEVICE

CROSS REFERENCES TO RELATED APPLICATIONS

The present application is a US National Phase of PCT Application No. PCT/GB2011/051636, filed on Aug. 31, 2011, which claims the benefit under 35 U.S.C. §119(a)-(d) of British Application GB 1014477.2 filed on Aug. 31, 2010, the disclosure of which is incorporated herein by reference.

The present invention relates to a conveyor device, and more particularly to such a device which dispenses with the need for a direct mechanical and/or electrical connection between a conveyor unit of the device and its support. Preferably but not necessarily, the conveyor device is a dynamic checkweighing device.

A dynamic checkweighing device is known and this is conventionally an in-line automatic weigher having a conveyor. As an item, such as a food or pharmaceutical package, is received on the conveyor, a force transducer, such as a load cell, takes a weight measurement. The increase in weight over and above the conveyor allows the weight of the item to be determined by an electronics control system.

However, a problem associated with the conventional device is that hygiene and sanitation are important factors. Therefore, at frequent intervals, the conveyor unit must be cleaned. Certainly on smaller devices, this would typically entail removal from its support. Presently, this involves decoupling of drive shafts and/or gear mechanics, as well as electrical feeds, before the axles of the conveyor rollers can be released from the support and the conveyor unit finally removed.

If the conveyor belt is fed between rollers so as to reduce extraneous forces imparted to the force transducer, then for cleaning the belt has to be carefully removed from between the rollers and also re-assembled thereafter. This process requires skill and precision re-alignment, as well as providing relatively inaccurate weighing results.

A further problem then exists once the conveyor unit is removed, in that cleaning must be undertaken very carefully so as not to damage or disrupt the drive mechanism to the conveyor belt. Often, total immersion in the cleaning liquid is required. However, electrical components and motors have to be initially removed or separated.

A final problem exists in that the drive feed to the rollers of the conveyor unit is at the side, thereby making it impossible to coaxially align multiple conveyor units with a close lateral separation between the neighbouring conveyor belts.

Similar issues are encountered with many conveyors, whether or not they utilise a dynamic weighing system.

The present invention seeks to overcome these problems.

According to a first aspect of the invention, there is provided a conveyor device comprising a support, a magnetic driving unit at the support, and a conveyor unit demountably supportable on the support, the conveyor unit including a magnetic drivable unit magnetically drivable by the said magnetic driving unit, and an endless conveyor belt extending around two spaced apart rollers, at least one of said rollers being drivable by the said drivable unit, whereby the conveyor is removable for cleaning without requiring disconnection of a physical drive and/or electrical feed.

Preferable and/or optional features of the first aspect of the invention are set forth in claims 2 to 19, inclusive.

According to a second aspect of the invention, there is provided a weighing system comprising an in-feed conveyor for accelerating an item to be weighed, a conveyor device in accordance with the first aspect of the invention which includes a weighing element at the support for dynamically weighing the said item as it travels on the conveyor unit, the conveyor device being downstream of the in-feed conveyor, and a take-off conveyor downstream of the conveyor device for separating off an out-of-weight-tolerance item following weighing.

According to a third aspect of the invention, there is provided conveyor apparatus comprising a mounting bed and a plurality of conveyor devices in accordance with the first aspect of the invention mounted laterally side-by-side on the said bed, so that respective neighbouring rollers are substantially coaxially aligned.

Preferably, each said conveyor device is slidably engagable with the bed. This thereby enables a modular and selective arrangement of the devices, dependent on necessity.

The invention will now be more particularly described, by way of example only, with reference to the accompanying drawings, in which.

Figure 1:
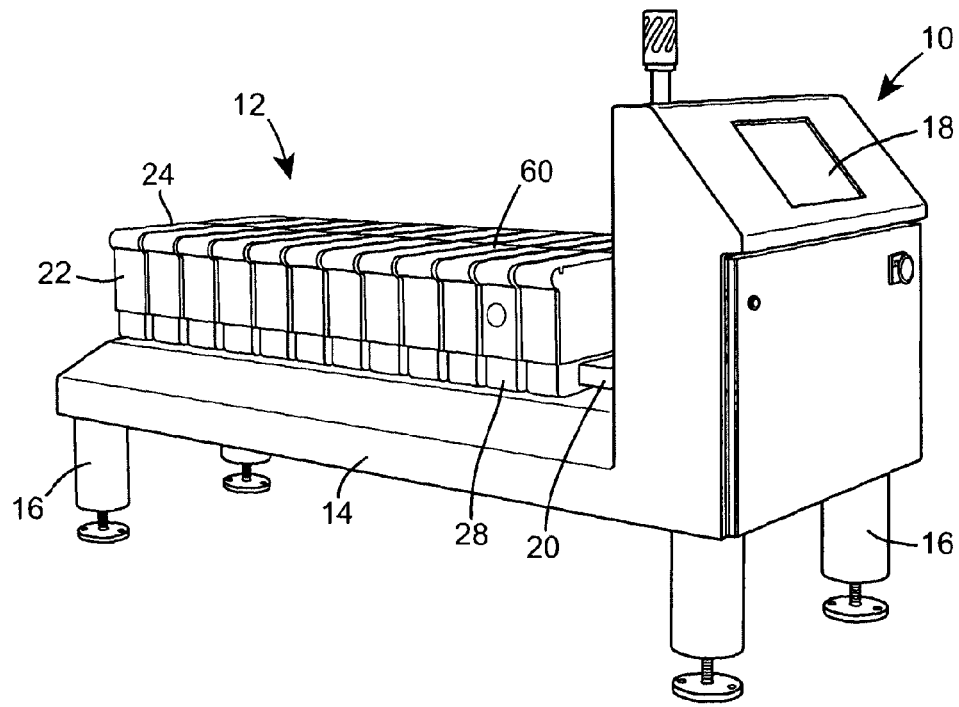
FIG. 1 shows a first embodiment of a plurality of conveyor devices, in accordance with the first aspect of the invention and shown coaxially supported in lateral alignment on a mounting bed.

Referring to the drawings, there is shown a mounting bed 10 for supporting a plurality of conveyor devices 12 both end on so as to form two columns, but also in close coaxial lateral alignment such that there is a minimum lateral spacing between neighbouring devices 12. In this case, the conveyor device 12 is a dynamic checkweighing device for dynamically checking a weight of an item as it moves therealong.

The mounting bed 10 preferably comprises an elongate chassis 14 having, preferably height-adjustable, supporting legs 16, and a control unit 18 at one end. Power is preferably fed via the control unit 18 to the chassis 14, which in turn feeds the conveyor devices 12.

Beneficially, the chassis 14 may provide one or more longitudinally extending keyed runners 20 on which each conveyor device 12 is slidably engagable. This thus allows modularity in terms of a number of conveyor devices 12 required, and allows simplified slidable removal of a conveyor device 12, should that be necessary.

Figure 2:
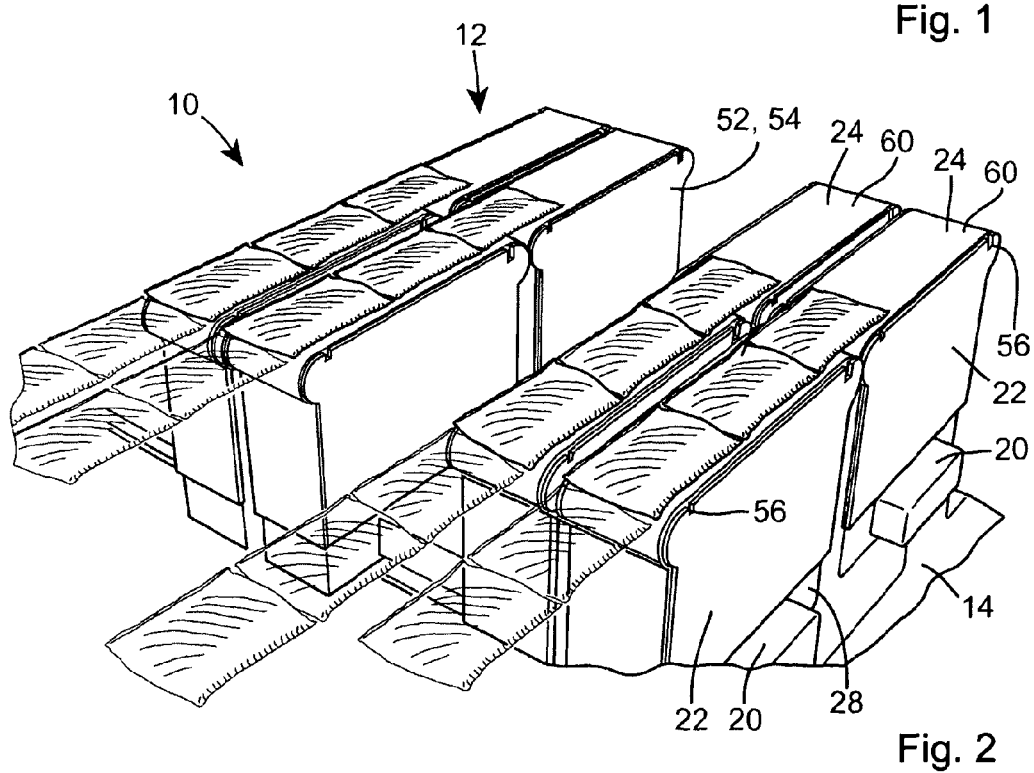
FIG. 2 is an enlarged perspective view of the conveyor devices, showing the conveyor units and items to be weighed travelling thereon.
Figure 3:
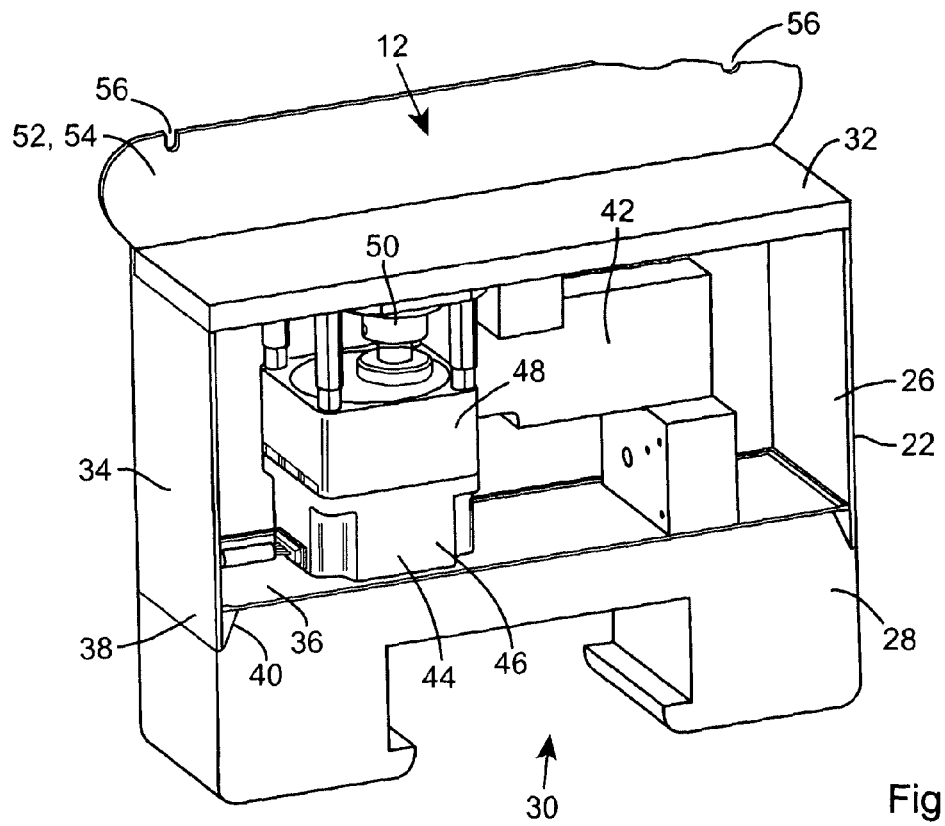
FIG. 3 is a partial longitudinal cross-sectional perspective view of a support of a said conveyor device and with one side of a cradle removed for clarity and with a conveyor unit removed.
Figure 4:
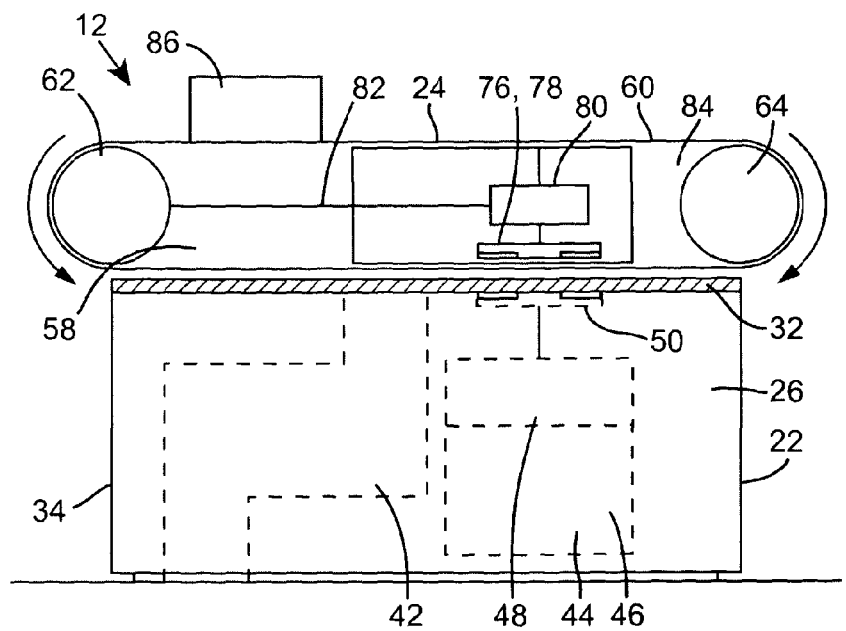
FIG. 4 is a further diagrammatic longitudinal cross-sectional view of the conveyor device with the conveyor unit supported by the cradle.

As best seen in FIGS. 2 to 4, each conveyor device 12 comprises a support 22 which is preferably engagable with the runner 20 of the mounting bed 10, and a conveyor unit 24 supported by the support 22. The support 22 in this case comprises a housing 26 and a base 28 which includes a keyway 30 for receiving the runner 20. The housing 26 provides a sealed or substantially sealed enclosure in order to protect the interior from cleaning fluids, and the ingress of dirt and other particulate matter. To this end, the housing 26 includes a non-magnetic top plate 32, side walls 34 which depend from a perimeter edge of the top plate 32, and a flexible seal 36 which closes a bottom portion of the enclosure. The flexible seal 36 is preferably elastic and is seated on the base 28. The side walls 34 extend below the flexible seal 36 to form a locating skirt 38. The base 28 includes a chamfer 40 around its upper perimeter edge to receive the locating skirt 38. The chamfer 40 is slightly deeper than the locating skirt 38, whereby the housing 26 'floats' on the base 28 via the flexible seal 36.

Within the housing 26, a force transducer 42 and a magnetic driving unit 44 and are provided. Both are seated on the flexible seal 36 are thus supported by the base 28 with the flexible seal 36 interposed therebetween. The force transducer 42 is, in this embodiment, a cantilevered arm load cell arrangement which engages and supports the non-magnetic top plate 32. However, other kinds of load cell arrangement can be utilised, such as a compression column.

The magnetic driving unit 44 includes an electric motor 46, preferably a gearbox 48, and a rotatable magnetic driving element 50, in this case being a magnetic disk forming part of a magnetic clutch, drivable by the motor 46 via the gearbox 48. The rotatable magnetic driving element 50 is preferably spaced from an underside of the non-magnetic top plate 32 to reduce wear and limit unnecessary frictional losses.

The support 22 further includes a cradle 52 having opposing parallel cradle walls 54 which upstand from top longitudinal perimeter edges of the top plate 32. Upper edges of the cradle walls 54 include two notches 56 which are spaced apart and located close to respective ends of the cradle walls 54.

Figure 5:
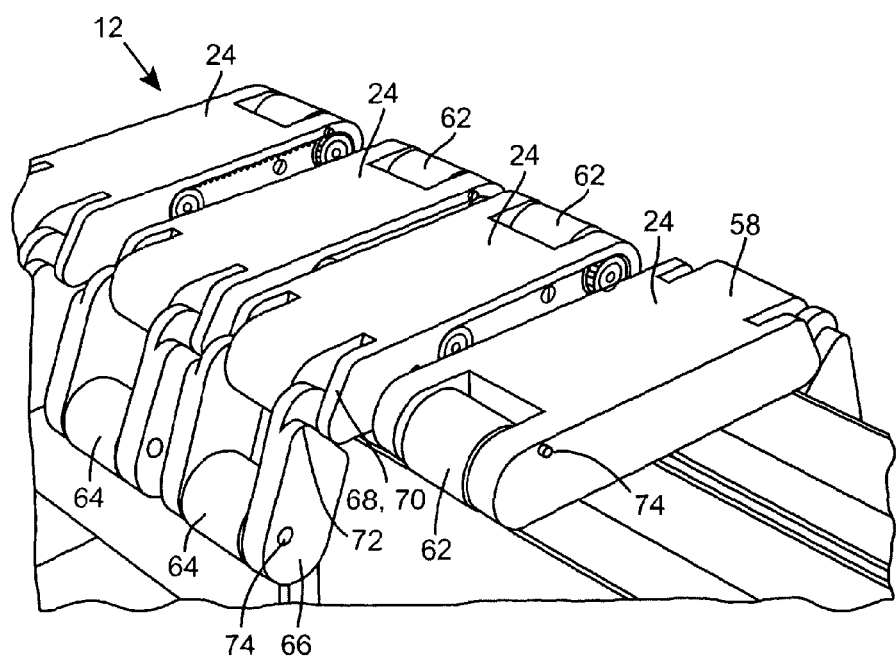
FIG. 5 is a perspective view of the conveyor unit, removed from the cradle and with its conveyor belt removed ready for cleaning.

Turning now to the conveyor unit 24, this comprises a conveyor housing 58 and a conveyor belt 60 entrained around the conveyor housing 58. The conveyor unit 24 is best seen in FIGS. 4 and 5. The conveyor housing 58 is preferably plastics and sealed or substantially sealed against liquid ingress. The conveyor housing 58 supports first and second rollers 62, 64 at or adjacent to its opposing ends. The first roller 62 is a driving roller, and the second roller 64 is preferably a driven idler roller. The idler roller 64 may be supported by a support arm 66 which is pivotably engaged with the conveyor housing 58.

The hinge 68 of the support arm 66 preferably includes angled wall portions 70 abuttable with similarly angled wall portions 72 of the conveyor housing 58, so that when inverted the support arm 66 depends downwardly and when righted the support arm 66 locks out to become coplanar or substantially coplanar with the conveyor housing 58. This is advantageous in providing substantially automatic tensioning of the conveyor belt 60. Other lock out means for the support arm 66 may be envisaged. However, in the present case, to remove the conveyor belt 60, the conveyor unit 24 is simply inverted whereby the arm 66 pivots allowing the conveyor belt 60 to slacken. With the conveyor belt 60 repositioned about the conveyor housing 58 and support arm 66, the conveyor unit 24 is simply reinverted to automatically retension the conveyor belt 60 by the support arm 66 pivoting under the influence of gravity.

Locator elements 74 are included on the axles of or adjacent to the first and second rollers 62, 64 on the conveyor housing 58 and the support arm 66. In this case, the locator elements 74 are pins or tabs, and are adapted to be slidably receivable in the receptive notches 56 of the cradle walls 54. The positioning of the locator elements 74 and the notches 56 are such that the conveyor belt 60 sits just proud of the upper edge of each cradle wall 54. Each notch 56 is also preferably in use vertically or substantially vertically oriented so that the conveyor unit 24 is retained with the cradle 52 via gravitational engagement.

The locator elements 74 and notches 56 are also preferably not identical, so that the conveyor unit 24 can only be mounted to the cradle 52 in one orientation. This is a benefit of the pivotable support arm 66, whereby the conveyor unit 24 cannot be mistakenly mounted upside down, since the support arm 66 will fold.

Within the preferably sealed conveyor housing 58 resides a magnetic drivable unit 76 having a rotatable magnetic drivable element 78 forming the other part of the magnetic clutch, gearbox 80 if required, and drive shaft 82 extending to and engaging the driving roller 62. The rotatable magnetic drivable element 78 is preferably also a disk which is held in spaced relationship with a lowermost interior surface of the conveyor housing 58. The rotatable magnetic drivable element 78 is positioned so that, with the conveyor unit 24 mounted on the cradle 52, it is coaxially aligned or substantially coaxially aligned with the rotatable magnetic driving element 50 in the support housing 26.

The positioning of the rotatable magnetic drivable element 78 and the rotatable magnetic driving element 50 provides for the conveyor belt 60 to pass therebetween without affecting the transmission of drive to the driving roller 62. The conveyor housing 58 is thus fully or substantially fully located within a space 84 defined by the lower surface of the conveyor belt 60 and the planar or substantially planar walls 54 of the cradle 52.

In use, the load cell 42 is calibrated based on a combined base-weight of the support housing 26, cradle 52 and conveyor unit 24. Beneficially, the magnetic driving unit 44 is spaced from the top plate 32 and thus is not supported by the load cell 42, thereby reducing the base-weight reading. Furthermore, by substantially isolating the load cell 42 from the magnetic driving unit 44, the accuracy of the load cell 42 can be improved due to less vibrational interference being transmitted to the load cell 42 by the in use motor 46 of the magnetic driving unit 44.

With the conveyor unit 24 supported on the cradle 52, the magnetic driving unit 44 is energised and thus the magnetic driving element 50 imparts rotational drive to the magnetic drivable element 78 in the conveyor housing 58 and through the conveyor belt 60. The magnetic drivable unit 76 thus drives the driving roller 62, causing the conveyor belt 60 to rotate. The conveyor belt 60 is spaced from the rotatable magnetic driving element 50, the rotatable magnetic drivable element 78 and also preferably the top plate 32, thereby minimising wear and frictional losses. As an item 86 travels along the conveyor belt 60, a weight reading is taken dynamically by the load cell 42 and outputted.

For periodic cleaning, the conveyor unit 24 is simply lifted up and clear of the cradle 52 without requiring release of any fasteners or disengagement of any physical drive or electrical feed. It is inverted to release the tension on the conveyor belt 60, and thus both the conveyor belt 60 and the sealed conveyor housing 58 can be cleaned thoroughly. Reassembly is simple by entraining the conveyor belt 60 around the first and second rollers 62, 64, and then reinverting the conveyor housing 58 to retension the conveyor belt 60 by pivoting of the support arm 66. Once the sealed support housing 26 is also sanitised, the conveyor unit 24 is simply dropped back onto the cradle 52 and operation can resume without requiring reengagement of any fastenings, physical drive mechanism or electrical feed. Tensioning and the dimensions of the cradle 52 are such that the conveyor belt 60 is preferably out of contact with the top plate 32 of the support housing 26 at least during use.

Due to the conveyor housing 58 preferably being within or substantially within the space 84 defined by the underside of the conveyor belt 60, the support housing 26 and cradle 52 can also have a lateral extent which is only marginally greater than the width of the conveyor belt 60. This allows a plurality of the conveyor devices 12 to be positioned in very close lateral proximity, such that the corresponding rotational axes of the first and second rollers 62, 64 of neighbouring conveyor devices 12 are aligned or substantially aligned.

Although the conveyor device or devices 12 can be utilised independently, a weighing system may be provided which comprises an in-feed conveyor for accelerating an item to be weighed, one or more of the previously described conveyor devices 12 downstream of the in-feed conveyor and which dynamically weighs the said item as it moves along the conveyor unit 24, and a take-off conveyor downstream of the conveyor device 12 for separating off an out-of-weight-tolerance item following weighing.

The weighing element, being a load cell in this case, may be dispensed with if the conveyor device is not required to provide a weight measurement. In this case, the floating housing may not be required, and the support housing can be fixed in place to the base.

The magnetic driving unit may be provided to one side of the conveyor unit. In this case, the magnetic drivable unit is also preferably provided at the side of the conveyor unit, instead of being fully within the space defined by the underside of the conveyor belt. This arrangement is beneficial for larger conveyor devices, for example having a conveyor belt which is a meter or more wide and three or more meters long. In this case, the conveyor unit may be cantilevered from the support.

A significant advantage of the magnetic drive mechanism utilised herein and throughout is the physical separation of the conveyor unit from the support, thus leaving an air gap which can be washed and inspected.

Although the support housing and the conveyor housing are preferably sealed, there may be uses whereby the sealing is not essential. As such, the support housing may be dispensed with in favour of an open support, and the conveyor housing may simply be a framework in which the magnetic drivable unit is housed.

Furthermore, other means for tensioning the conveyor belt may be envisaged, such as a telescopically extendable and retractable support arm or body, or the conveyor belt itself may include a tension adjuster.

The second roller may be a driving roller rather than an idler. In this case, the magnetic drivable unit simply supplies drive to both rollers.

It is thus possible to provide a conveyor device which includes a sit-on-top demountable conveyor unit drivable by a magnetic drive mechanism. The sit-on-top conveyor unit can thus be picked off its cradle by a single operator using one hand and without release of any fastener, physical drive or electrical feed. The conveyor unit can be cleaned and reseated, being engaged with its cradle via gravity. The load cell, other force transducer or weighing means also has improved accuracy and longevity due to the motor of the magnetic drive mechanism not being supported by the weighing means. Thereby less mechanical noise need be filtered out before a reading can be determined. The omission of spanning electrical cables in the wash down area reduces microbiological risk and improves reliability. Typically, all the drive mechanicals and system electrical and/or electronic components are located inside the water-tightly sealed support housing and/or the conveyor housing. It is also possible to provide a cantilevered conveyor unit which is also drivable by the magnetic drive mechanism. The magnetic drive mechanism having the spaced apart magnetic clutch plates provides a conveyor device which is simple to wash down with good visible and physical access.

The embodiments described above are provided by way of examples only, and various other modifications will be apparent to persons skilled in the field without departing from the scope of the invention as defined by the appended claims.

The invention claimed is:

1. A conveyor device comprising a support, a magnetic driving unit at the support, and a conveyor unit demountably supportable on the support, the conveyor unit including a magnetic drivable unit magnetically drivable by the said magnetic driving unit, and an endless conveyor belt extending around two or more spaced apart rollers, at least one of said rollers being drivable by the said drivable unit, whereby the conveyor is removable for cleaning without requiring disconnection of a physical drive and/or electrical feed, and wherein the conveyor unit includes a pivotable tensioning arm to which a said roller is mounted for rotation.

2. The conveyor device as claimed in claim 1, further comprising a weighing element at the support which dynamically weighs an item as it moves along the conveyor unit.

3. The conveyor device as claimed in claim 1, wherein the conveyor unit is at least substantially sealed to protect against splashing during cleaning.

4. The conveyor device as claimed in claim 1, wherein the conveyor belt extends between the magnetic driving unit and the magnetic drivable unit, so that drive is transmitted through the in use conveyor belt.

5. The conveyor device as claimed in claim 4, wherein the conveyor belt is spaced from the magnetic driving unit and the magnetic drivable unit.

6. The conveyor device as claimed in claim 4, wherein the conveyor belt is spaced from the support.

7. The conveyor device as claimed in claim 1, wherein the magnetic drivable unit is at least substantially fully housed within a space defined at least in part by the underside of the conveyor belt.

8. The conveyor device as claimed in claim 1, wherein the magnetic drivable unit is at least in part at one side of the conveyor belt.

9. The conveyor device as claimed in claim 1, wherein the conveyor unit includes a liquid-tight housing in which the magnetic drivable unit is housed, so that sanitisation can be undertaken.

10. The conveyor device as claimed in claim 1, wherein the support includes a non-magnetic plate interposed between the magnetic driving element and the magnetic drivable element.

11. The conveyor device as claimed in claim 1, wherein the support includes a support housing in which the magnetic driving unit and the weighing element are housed, a bottom portion of the support housing being closed by a flexible seal, thereby permitting vertical support housing movement whilst liquid-tightly closing the support housing.

12. The conveyor device as claimed in claim 11, wherein the weighing element floatingly supports the housing relative to the base.

13. The conveyor device as claimed in claim 1, wherein the support includes a cradle which releasably supports the conveyor unit, the cradle supporting the conveyor unit at or adjacent to rotational axes of the rollers.

14. The conveyor device as claimed in claim 13, wherein the conveyor unit is gravitationally engagable with the cradle.

15. A conveyor device as claimed in claim 13, wherein the conveyor unit is engagable with the cradle without the use of a separate fastening device, thereby enabling quick pickup release.

16. Conveyor apparatus comprising a mounting bed and a plurality of conveyor devices as claimed in claim 1 mounted side-by-side on the said bed, so that respective neighbouring rollers are substantially coaxially aligned.

17. Conveyor apparatus as claimed in claim 16, wherein each said conveyor device is slidably engagable with the bed.

18. A conveyor device comprising a support, a magnetic driving unit at the support, and a conveyor unit demountably supportable on the support, the conveyor unit including a magnetic drivable unit magnetically drivable by the said magnetic driving unit, and an endless conveyor belt extending around two or more spaced apart rollers, at least one of said rollers being drivable by the said drivable unit, whereby the conveyor is removable for cleaning without requiring disconnection of a physical drive and/or electrical feed, and wherein the support includes a support housing in which the magnetic driving unit and the weighing element are housed, a bottom portion of the support housing being closed by a flexible seal, thereby permitting vertical support housing movement whilst liquid-tightly closing the support housing.

19. The conveyor device as claimed in claim 18, wherein the weighing element floatingly supports the housing relative to the base.

20. The conveyor device as claimed in claim 18, wherein the conveyor unit includes a pivotable tensioning arm to which a said roller is mounted for rotation.

\* \* \* \* \*